United States Patent [19]

Müerdter et al.

[11] Patent Number: 4,586,575
[45] Date of Patent: May 6, 1986

[54] MEASURING APPARATUS WITH AUTOMATIC OPERATING MODE-SETTING

[75] Inventors: Herbert Müerdter, Albstadt; Bernhard Hermann, Schömberg; Johann Pfister, Balingen, all of Fed. Rep. of Germany

[73] Assignee: August Sauter GmbH, Albstadt, Fed. Rep. of Germany

[21] Appl. No.: 706,659

[22] Filed: Feb. 28, 1985

[30] Foreign Application Priority Data

Feb. 29, 1984 [DE] Fed. Rep. of Germany ....... 3407463

[51] Int. Cl.⁴ .................... G01G 23/02; G01G 23/14
[52] U.S. Cl. .................................. 177/124; 177/125; 177/164; 364/466
[58] Field of Search .............. 177/164, 165, 125, 124; 364/466, 567

[56] References Cited

U.S. PATENT DOCUMENTS

| | | | |
|---|---|---|---|
| 3,727,706 | 4/1973 | Streater et al. | 177/165 X |
| 3,851,720 | 12/1974 | Williams, Jr. | 177/165 X |
| 3,853,267 | 12/1974 | Cadwell et al. | 177/165 X |
| 4,412,591 | 11/1983 | Reichmuth et al. | 177/165 X |
| 4,481,587 | 11/1984 | Daniels, Jr. | 364/466 |
| 4,509,608 | 4/1985 | Hikita | 364/466 X |

*Primary Examiner*—George H. Miller, Jr.
*Attorney, Agent, or Firm*—Holman & Stern

[57] ABSTRACT

A measuring apparatus such as a scale comprising a weighing platform module, an evaluation module including a microprocessor, and a connecting cable for operatively connecting the modules, the apparatus being operable in at least two (2) different operating modes such as a weighing mode, a calibration and adjustment mode, and a servicing and diagnosis mode, has a plug and socket connection between the modules which, when connected, sets the apparatus in a predetermined one of the operating modes, conveniently the weighing mode. The currently operative mode is automatically determined by the plugging in or unplugging of the connector cable with or without an intermediate plug. This ensures simple and substantially error-free operation of the apparatus.

8 Claims, 3 Drawing Figures

MEASURING APPARATUS WITH AUTOMATIC OPERATING MODE-SETTING

BACKGROUND OF THE INVENTION

This invention reates to measuring apparatus, such as a scale, having an information generating module, such as a measuring sensor which may be in the form of a weighing platform, and an information evaluation or processing module including a microprocessor, which can be connected to the generating module by a connecting conductor, and wherein the measuring apparatus is operable in at least two different operating modes.

As capacities of microprocessors continue to increase, it is readily possible to incorporate a large number of memory functions into a measuring apparatus, to achieve performance beyond mere measurement determination. Thus, in the case of measuring apparatus in the form of a scale, a memory beyond a basic weighing function can be built into the scale.

In order to minimize unnecessary complication and difficulty from the user standpoint, and still provide a versatile apparatus, it is desirable that the user encounter and have access to only those functions of a measuring apparatus which are required for the task at hand, and which, in the case of a scale may be merely a weighing function. All other functions and the memory in excess of that needed for the task at hand preferably should not interfere with or distract the user. Further, for the calibration of various measuring devices, including scales, only the operating mode necessary for carrying out the calibration function of the measuring apparatus should be available. Operating modes provided for in the memory other than the required operating mode should not be accessible to the user. Thus, the different modes should be mutually excludable.

It is known, in an apparatus with a plurality of operating modes, to provide for these modes to be selected in sequence. A pushbutton may, for example, be used for this purpose. When the pushbutton is repetitively operated, the individual operating modes are presented to a user in succession. This operating concept, however, is attended by a possibility of error, for example operation in the wrong mode. Further, it complicates the operation for the user and moreover may be unacceptable from a calibration standpoint for a number of apparatuses including scales.

SUMMARY OF THE INVENTION

It is an object of the invention, in measuring apparatus of the type described, to provide means for setting up the apparatus so that when ready for use it will necessarily and automatically be in a preselected operating mode.

The above object is achieved according to the invention, in that a selected operating mode of the measuring apparatus is defined by the connection and disconnection of a connecting conductor between the respective modules of the apparatus, and/or by the type of the connecting conductor. The connecting conductor according to the invention may, for example, be a connecting cable with a plug which engages a corresponding socket on the evaluation module in order to establish a predetermined operating mode through the mutual cooperation of the respective plug and socket components.

Thus, in devices of the type described, a required operating mode may be established simply by connecting a relevant cable or other connecting conductor, and it is no longer necessary to correctly operate an actuating key or the like on an operating array of the evaluation module. Instead, it is sufficient merely to connect the evaluation module to the information generating module via the connecting cable which in any case is a necessary step. By so doing, a normal operating mode, such as a "weighing" mode is automatically set in the memory of the evaluation module. There is no additional expense, for example capital expense, the process is simple, and the required effect is achieved substantially without error. The process is reliably error-free, because with the arrangement illustrated, the apparatus is put in the operationally ready state automatically in the normal operating mode which is the only mode to which a user commonly need have access. The essence of the invention is that an operating mode is selected and automatically set by the mere connection of a selected connecting conductor or cable. Further in accordance with the invention, the arrangement may be such that if the connecting conductor is broken (or the connecting cable is unplugged) a different operating mode may be automatically made available. To this end, the connection between the modules may be established by hardware or software. In the latter case, the connection involves an exchange of characteristic messages, parameter messages, or code numbers stored in the respective modules.

A plug and socket connection by which the normal operating mode is established between the modules may advantageously be secured by a lead seal device. This provides assurance that following calibration of the apparatus, the person responsible for the calibration can fix the connection between the modules, thereby justifying the calibration. Then, in order for example for another weighing platform having different characteristic parameters (maximum loads, graduation) to be connected to the evaluation module it is necessary to break the calibration lead seal and recalibrate the apparatus. Conversely, if the lead seal is broken, this may indicate possible substitution of the weighing platform. If it is desirable to prevent such substitution because it invalidates the calibration, the lead seal reliably serves this purpose.

It may be desirable for calibration personnel or service technicians to be able to use operating modes in addition to the one automatically established by connection of the modules. There are various ways in which this may be accomplished. For example, after disconnection of the connecting cable (which may entail breaking of the lead calibration seal) an adapter in the form of an intermediate plug provided for the purpose may be inserted between the plug on the end of the connecting cable and the socket on the evaluation module. When the system is connected back together, this adapter connects certain pins of the plug to certain contacts of the socket in a combination differing from that of the direct plug-socket combination, so that a different operating mode is set automatically, for example a final calibration and adjustment program or a servicing program.

It is further possible to arrange the evaluation module such that when a certain measuring sensor is not connected, for example when the connecting cable is unplugged after the apparatus has been turned in, an operating mode other than the normal operating mode prevails automatically. For example, here again, a servicing program can be automatically established.

It is also possible automatically to select a particular alternative operating mode by unplugging and reconnecting the connecting cable with the evaluation module switched on. The alternative mode may for example comprise a final calibration and adjustment program.

Thus, in one application of the invention, when the evaluation module is turned on while disconnected from the weighing platform, a service program may first become available for use in maintenance or repair work. If the information generation module is then connected to the evaluation module via the connecting cable, a calibration program may then become automatically available enabling the corresponding operations to be carried out. Thereafter, the connecting cable connection can be sealed with the lead seal. If the apparatus is now turned off and then turned on again, a normal operating mode, such as a weighing program, is then automatically set for the user. All of the steps are achieved automatically and substantially without error by the mere operation, such as turning on and off and assembly of the apparatus. Thus, complete exploitation of the apparatus memory may be made accompanied by a high degree of operating simplicity and security.

Additional details, advantages, and features of the invention will be apparent from the following description and claims taken in conjunction with the attached drawings.

DESCRIPTION OF PREFERRED EMBODIMENT

Figure 1:
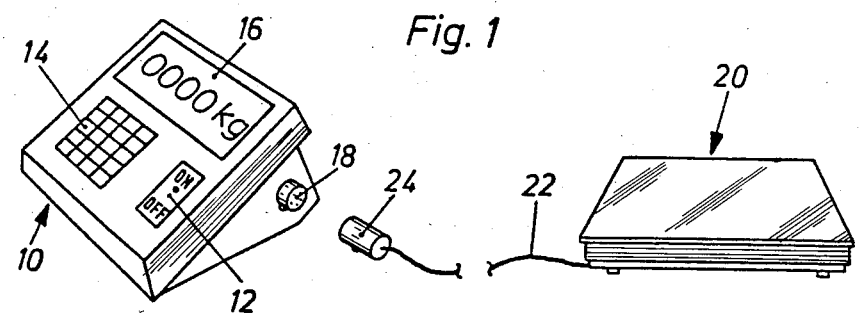
FIG. 1 is a semi-diagramatic perspective view of a weighing apparatus in accordance with the invention comprising an evaluation module, a weighing platform module, and a connecting cable for connecting the modules.

The drawings show weighing apparatus in the form of a gravimetric scale comprising an information generating module such as a weighing platform 20, an information or evaluation module 10, and a cable 22 for connecting the modules.

It is customary in gravimetric scales to provide various modes of operation. In each mode a specific program is made available by a microprocessor housed, for example, in the evaluation module. The following are examples of typical operating modes for such scales:

1. Weighing (zeroing, taring, weight indication, output weight).
2. Final calibration and adjustment, such as setting for a maximum load, graduation, setting for or registering a mimimum load, and following specific calibration procedures.
3. Servicing and diagnosis (testing, indicating errors or defects, diagnosing errors or defects).
4. Auxiliary tasks (for example counting, dosing, recording overall weight, check weighing).

The above modes of operation in general are independent of each other and represent specific solutions to specific problems. They are required by different persons at different operating times (for example users, service technicians, and special purpose users). In the following description, the way in which these modes of operation are automatically selected is explained.

The evaluation module 10 may include an on-off switch 12, a keyboard 14 for entering operating commands, and a display 16. The keys of the keyboard 14 are used for entry of different commands, depending on the current operating mode. The display 16 can also be variable so as to adapt to the different operating modes. The evaluation apparatus is further comprised of a connector socket 18.

In general use, the connecting cable 22 is permanently connected to the weighing platform 20, and has on its free end a plug 24 which plugs into the connector socket 18 of the evaluation module 10. The plug and socket are provided with connections such that when the plug 24 is inserted in the socket 18 and the on-off switch 12 of the evaluation module 10 is thereafter switched on, so that the evaluation module 10 is placed in operation, then the "weighing" mode is automatically entered, and all the keys on the keyboard 14 have the functions required for operation in the weighing mode.

Figure 2:
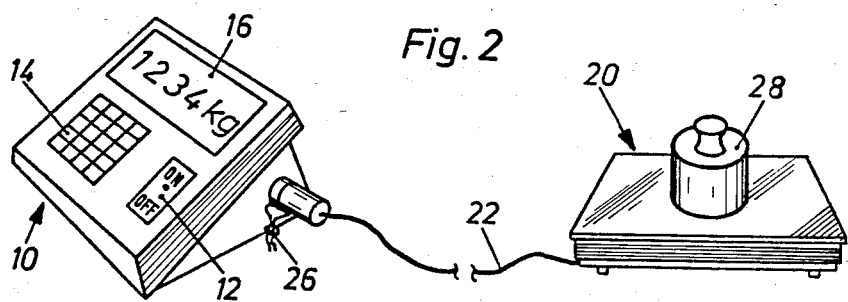
FIG. 2 is a view similar to FIG. 1 showing the modules connected by the connecting cable and in operation.

In order reliably and securely to retain this mode, which is considered the normal operating mode, for an extended period, the connection between the socket 18 and the plug 24 may be secured with a lead "calibration" seal 26 as shown in FIG. 2.

If a load 28 is set on the weighing platform of the weighing module, while the apparatus is in this mode, the weight of the load 28 can be displayed on the display 16.

If the apparatus should require opening, for example for servicing, it is sufficient to undo the calibration seal 26 and disconnect the connecting cable 22 by pulling the plug 24 out of the connector socket 18 of the evaluation module 10. If the power switch 12 is now switched on, the circuitry is made such that the scale automatically runs in a different program, namely the servicing program. The keys of the keyboard 14 now have different assignments than previously, which relate to the events in the new program (for example in the case of a querying program, they make choices and acknowledgements).

The evaluation module can alternatively be set up such that when the connecting cable 22 is disconnected, the evaluation module can be operated in the "final calibration and adjustment" mode.

Independently of the mode chosen previously, FIG. 1 shows a mode option set for the evaluation module 10 when the weighing platform 20 is not connected, the unconnected mode option going into effect regardless of the previous mode.

Figure 3:
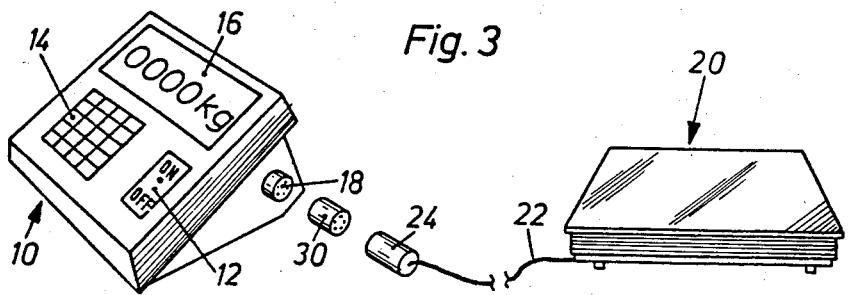
FIG. 3 is a view similar to FIG. 1 but also showing an intermediate plug, or adapter, which can be used with the cable for operating the apparatus in a different mode.

FIG. 3 illustrates another possible means of changing the operating mode from the normal "weighing" mode of FIG. 2. Here, an intermediate plug 30 is shown between the connector socket 18 and the plug 24 of the connecting cable 22. The intermediate plug 30 is in the form of an adapter which, when it is inserted between the socket 18 and the plug 24 and the assembly is plugged back together, affords a different type of connection from that normal operation, which different connection in turn leads to the selection of a different operating mode, for example the "final calibration and adjustment" mode. In this way, it is possible to adjust the entire scale comprised of the evaluation module 10 and the weighing platform module 20 to another maximum weight or to some other parameter. If this has been carried out and the requirement for the changed setting (i.e. "off") has ended, for example the "final calibration and adjustment" process has been completed, the intermediate plug 30 may then be removed, the plug 24 plugged back directly into connector socket 18, and the connection sealed with a lead seal. When the evaluation module 10 is then turned back on, it will be in the normal "weighing" mode, with the associated set of established conditions available to the user.

In practice, the sequence of events may be as follows: When the scale is set up for the first time, with the system in the configuration of FIG. 1, and the plug 24 removed from the connector socket 18, the apparatus is switched on with switch 12, setting the evaluation module 10 automatically in the "final calibration and adjustment" operating mode. If now the connecting cable 22 from the weighing platform 20 is plugged into the evaluation module, with the evaluation module 10 left in its "on" state, the operating mode is not changed. However, the weighing platform module 20 is now connected to the evaluation apparatus 10, so that the final calibration and adjustment process can proceed sequentially, wherein the microprocessor may query the individual parameters (for example maximum load, graduation) from the operator, according to an established menu. The operator responds on the keys of the keyboard 14 with entries such as "yes", "no", or "supply more information".

If, for example, a 100 kg scale is to be calibrated and the calibration program presents a series of possible maximum loads (for example, 10, 50, 100, 200, 500 kilograms) when the quantity 100 kg is presented the operator will press the "yes" key. This will indicate to the microprocessor system that a 100 kg scale has been connected. The microprocessor system would then switch to querying about the graduation.

In this manner, the individual parameters of the particular weighing platform 20 can be input to the evaluation module 10 and stored. When the weighing platform 20 and the evaluation module 10 are completely mutually adjusted in this sense, the lead calibration seal 26 can be applied. If at this point the scale is turned off and then immediately or at a later time is turned back on to carry out weighing, in view of the connection between the evaluation module 10 and the weighing platform 20 through the connecting cable 22, the apparatus will be automatically set in the "weighing" mode, and the keys of the keyboard 14 will be automatically programmed for the functions provided for the user (such functions as zeroing, taring, test actuation).

While only preferred embodiments of the invention have been described herein in detail, the invention is not limited thereby and modifications are possible within the scope of the attached claims.

Accordingly, we claim:

1. Measuring apparatus such as a scale comprising an information generating module, such as a weighing platform moduel, an evaluation module including a microprocessor, and a connecting conductor for operatively interconnecting the modules, the measuring apparatus having at least two (2) different operating modes, and the connecting conductor including connector means for setting the apparatus in a predetermined one of said modes.

2. Measuring apparatus according to claim 1 wherein the connecting conductor is in the form of a connecting cable, the connector means comprising a first connector element such as a plug on the cable, and a second connector element such as a plug-receiving socket on the evaluation module.

3. Measuring apparatus according to claim 2 wherein the connector elements include mutually cooperable means for setting the apparatus in a normal weighing mode of operation.

4. Measuring apparatus according to claim 2 including a sealing device for securing a connection between the respective connector elements.

5. Measuring apparatus according to claim 2 including an intermediate connector element for insertion between the first and second connector elements for setting the apparatus in an alternative preselected operating mode.

6. Measuring apparatus according to claim 1 including means associated with the evaluation module for automatically setting the evaluation module in an operating mode other than said predetermined mode when the modules are disconnected and the evaluation module is switched on.

7. Measuring apparatus according to claim 6 characterized in that when the evaluation module is switched on with the modules connected, the apparatus is set in the predetermined operating mode.

8. Measuring apparatus according to claim 7 characterized in that when the evaluation module is switched on with the modules connected, and thereafter the information generating module is disconnected and then reconnected, the evaluation module will be set in said operating mode other than the predetermined operating mode.

* * * * *